(12) United States Patent
Gaiser et al.

(10) Patent No.: US 10,092,995 B2
(45) Date of Patent: Oct. 9, 2018

(54) METHOD OF GRINDING GEARS

(71) Applicant: THE GLEASON WORKS, Rochester, NY (US)

(72) Inventors: Uwe Gaiser, Ostfildern (DE); Eric G. Mundt, Rochester, NY (US)

(73) Assignee: THE GLEASON WORKS, Rochester, NY (US)

( * ) Notice: Subject to any disclaimer, the term of this patent is extended or adjusted under 35 U.S.C. 154(b) by 77 days.

(21) Appl. No.: 15/308,102

(22) PCT Filed: Jun. 9, 2015

(86) PCT No.: PCT/US2015/034814
§ 371 (c)(1),
(2) Date: Nov. 1, 2016

(87) PCT Pub. No.: WO2015/191519
PCT Pub. Date: Dec. 17, 2015

(65) Prior Publication Data
US 2017/0057052 A1    Mar. 2, 2017

Related U.S. Application Data

(60) Provisional application No. 62/011,073, filed on Jun. 12, 2014.

(51) Int. Cl.
| | | |
|---|---|---|
| B24B 51/00 | (2006.01) | |
| B23F 23/12 | (2006.01) | |
| B23F 1/02 | (2006.01) | |
| B23F 5/02 | (2006.01) | |
| B23F 5/08 | (2006.01) | |
| B23F 5/10 | (2006.01) | |
| B23F 9/02 | (2006.01) | |

(52) U.S. Cl.
CPC ............. *B24B 51/00* (2013.01); *B23F 1/02* (2013.01); *B23F 5/02* (2013.01); *B23F 5/08* (2013.01); *B23F 5/10* (2013.01); *B23F 9/025* (2013.01); *B23F 23/1225* (2013.01)

(58) Field of Classification Search
CPC .... B24B 51/00; B23F 1/02; B23F 5/02; B23F 5/08; B23F 5/10; B23F 9/025; B23F 23/1225
USPC ...................................... 451/21, 47
See application file for complete search history.

(56) References Cited

U.S. PATENT DOCUMENTS

| | | | | |
|---|---|---|---|---|
| 4,865,497 A | * | 9/1989 | Faulstich | B23F 5/163 409/12 |
| 4,981,402 A | * | 1/1991 | Krenzer | B23F 9/00 409/26 |
| 5,014,467 A | * | 5/1991 | Luhmer | B23F 5/06 451/11 |
| 6,712,566 B2 | * | 3/2004 | Stadtfeld | B23F 9/025 409/26 |
| 7,974,730 B2 | | 7/2011 | Dürr | |

FOREIGN PATENT DOCUMENTS

EP    2570221 A2    3/2013

OTHER PUBLICATIONS

International Search Report and Written Opinion for PCT/US2015/034814, ISA/EPO, dated Dec. 21, 2015, 11 pgs.

* cited by examiner

*Primary Examiner* — George Nguyen
(74) *Attorney, Agent, or Firm* — Robert L. McDowell

(57) ABSTRACT

A method of grinding the tooth slots of a workpiece with a freshly dressed grinding wheel wherein dual-machining of tooth slots is eliminated. The method comprises grinding the first few slots of a gear at a corrected depth amount which accounts for the rapid wear and other conditions of the freshly dressed grinding wheel wherein for a first number of tooth slots (e.g. 1, 2, 3 or more), the grinding wheel is fed-in relative to the workpiece by the corrected depth amount.

10 Claims, 1 Drawing Sheet

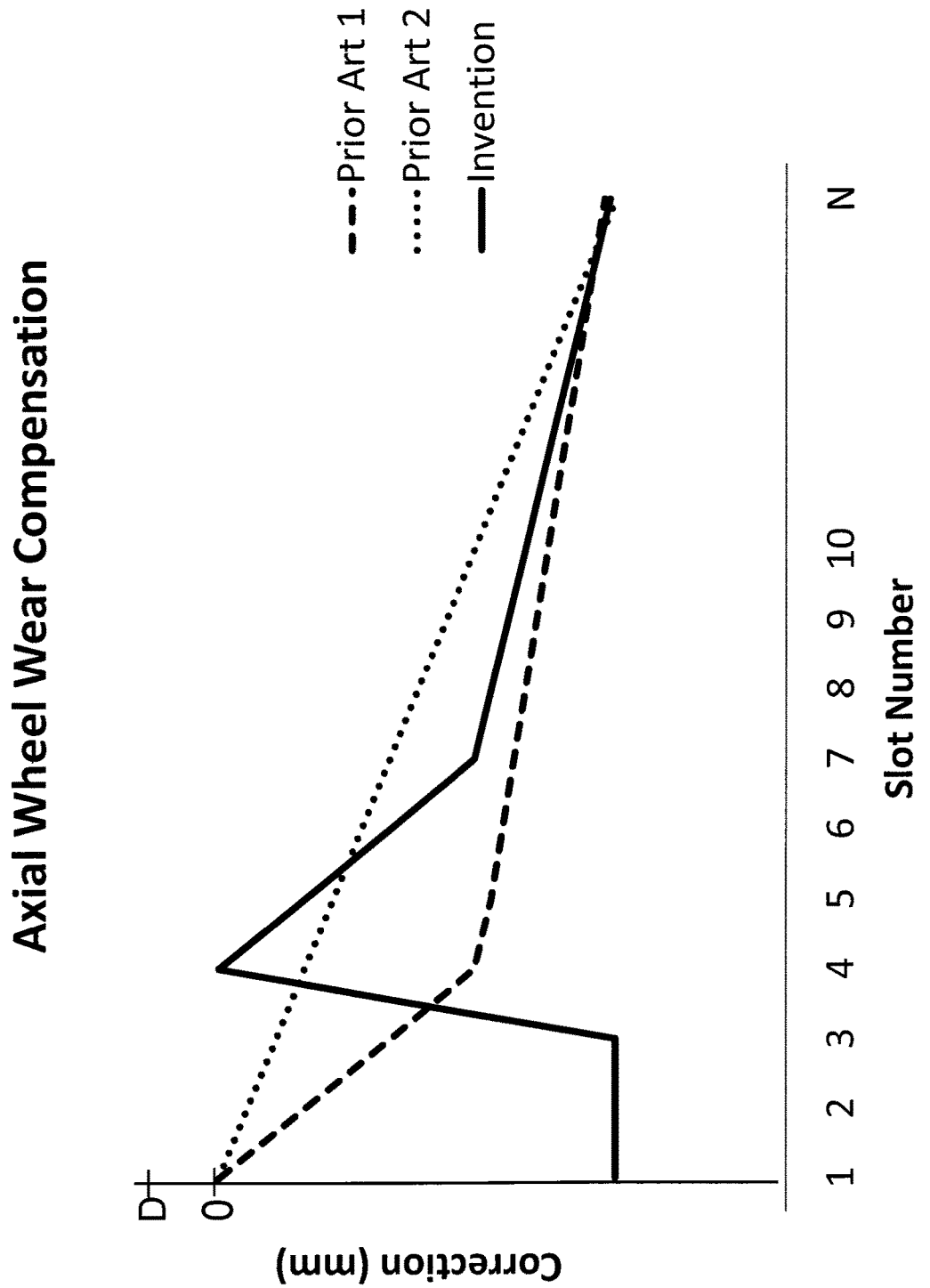

METHOD OF GRINDING GEARS

FIELD OF THE INVENTION

The present invention is directed to the manufacture of gears and in particular to a finishing process for bevel gears.

BACKGROUND OF THE INVENTION

In the production of gears by the face milling process, tooth slots are formed individually in succession by feeding a rotating tool into a workpiece to a predetermined depth, withdrawing the tool, and indexing the workpiece to the next tooth slot position (intermittent indexing). The steps of feeding, withdrawing and indexing are repeated until all tooth slots are formed. Face milling processes can be carried out as a non-generating process (where the profile shape of a tooth on a workpiece is produced directly from the profile shape on the tool) or a generating process (where the tool and workpiece are rolled together in a predetermined relative rolling motion, known as the generating roll, to "generate" the profile shape of a tooth).

In a finishing process such as grinding, a circular (e.g. cup-shaped) grinding wheel is suitable for finishing the teeth of a workpiece that have been formed by a non-generated or generated face milling cutting process. Grinding processes may also be non-generating or generating. Machines for carrying out such cutting and grinding processes are well known to the skilled artisan with the CNC machine as disclosed in U.S. Pat. No. 6,712,566 being one example of such a commercially available machine.

With use, a grinding wheel becomes worn to the point where it is no longer suitable for producing precise tooth surfaces. Therefore, for dressable grinding wheels, it is customary to periodically dress (renew) a grinding wheel after a specified number of gears (e.g. one or more) have been ground in order to restore the original cutting condition of the grinding wheel.

In order to compensate for the normal continual wear of a grinding wheel during processing, it is known to program a grinding machine to effectively feed the dimensionally-shrinking grinding wheel progressively deeper into successive tooth slots of a gear workpiece by small increments in order to maintain uniform tooth depth and thickness.

It has been observed that with freshly-dressed grinding wheels, the grinding wheel exhibits a higher than normal amount of wear during grinding of the first few (e.g. 1, 2, 3 or more) tooth slots of a workpiece. This is believed due to some residual amount of loose abrasive grains and/or binder material resulting from the dressing process which is then rapidly worn away once grinding commences. In some instances, a freshly-dressed grinding wheel is actually sharper than intended due to the removal of binder material during dressing resulting in some abrasive grains projecting out of the remaining binder material by an excessive amount.

One solution to the above wear condition is addressed in U.S. Pat. No. 7,974,730 wherein it is disclosed that when grinding with a freshly-dressed grinding wheel, an initial number of tooth slots (e.g. 1, 2 or 3) are pre-machined to a depth that is considerably less than full-depth in order to overcome the initial rapid wear of the grinding wheel, the remainder of the tooth slots are ground normally and then the pre-machined slots are post-machined (e.g. regrinding) to achieve the appropriate depth. This process, however, requires additional cycle time in order to twice grind a certain number of tooth slots.

SUMMARY OF THE INVENTION

The present invention provides a method of grinding the tooth slots of a workpiece with a freshly dressed grinding wheel wherein dual-machining of tooth slots is eliminated. The method comprises grinding the first few slots of a gear at a corrected depth amount which accounts for the rapid wear and other conditions of the freshly dressed grinding wheel wherein for a first number of tooth slots (e.g. 1, 2, 3 or more), the grinding wheel is fed-in relative to the workpiece by the corrected depth amount.

BRIEF DESCRIPTION OF THE DRAWING

The drawing FIGURE shows a comparison of prior art grinding wheel wear compensation methods and the method of the invention.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will be discussed with reference to the accompanying drawings which illustrate the invention by way of example only. The use of "including", "having" and "comprising" and variations thereof herein is meant to encompass the items listed thereafter and equivalents thereof as well as additional items.

In the context of the present invention, the term "bevel" gears is understood to be of sufficient scope to include those types of gears known as bevel gears, "hypoid" gears, as well as those gears known as "crown" or "face" gears.

In the FIGURE, the dashed and dotted lines illustrate examples of two known prior art methods of addressing the wear of a grinding wheel as a gear is ground. In both methods, the first tooth slot (Slot Number 1) of a gear with N number of tooth slots is ground to a prescribed tooth slot depth in accordance with the design of the gear with no ("0" or zero) correction which would be expected since the grinding wheel has experienced no wear at this stage of the grinding process.

With subsequent tooth slots, 2-N, a correction in the form of an increase in the in-feed depth of the grinding wheel is included in order to address the continual wear of the grinding wheel. The Prior Art 1 correction method comprises a first portion (e.g. tooth slots 1-4) having a linear first correction amount (e.g. 0.005 mm/slot) followed by second portion (e.g. tooth slots 5-N) having a linear second correction amount (e.g. 0.0025 mm/slot) wherein the first amount is greater per slot than the second amount per slot.

The Prior Art 2 correction method illustrates a uniform correction amount (e.g. 0.003 mm/slot) applied throughout the grinding cycle for each tooth slot 2-N. However, both prior art methods start with no corrective action at tooth slot #1 and, therefore, no consideration is given to the rapid wear aspects of a freshly-dresses grinding wheel.

The present invention departs from the prior art methods in that the rapid wear aspects of a freshly-dressed grinding wheel are taken into consideration beginning with the first-ground tooth slot (i.e. tooth slot #1) and in a manner which eliminates the need for any secondary machining of tooth slots that is mandatory in the prior art discussed above.

In the invention, the wear condition of a freshly-dressed grinding wheel is determined. This may be accomplished by grinding a workpiece with a freshly-dressed grinding wheel and infeeding the grinding wheel to the same tooth depth (i.e. same machine axis depth setting) for each tooth slot on the workpiece. This shows the wear characteristics of the grinding wheel for each tooth of the workpiece. Effectively, this approach creates a "master" workpiece for the wear of the particular type of grinding wheel (e.g. size, binder material, abrasive size and type, etc.) and the type of workpiece (size, number of slots, material, etc.). Once the wear pattern of a freshly-dressed grinding wheel is known, corrections can be determined for each tooth slot such that the grinding wheel can be correctly fed into each workpiece tooth slot so that grinding of the tooth slots can be accomplished with consideration given to initial rapid wear but without the need to re-grind a certain number of tooth slots.

An example of the inventive grinding method is shown in the FIGURE. In the example, tooth slots 1, 2 and 3 are each ground to a greater depth setting (e.g. 0.005 mm) which addresses the rapid wear of the freshly-dressed grinding wheel. After the grinding of slot #3, the grinding wheel is considered to be "conditioned" and slot #4 may be ground with zero correction. Tooth slots 5-N are then ground according to a dual-portion manner of the type exhibited by Prior Art 1 in order to address the continual wear of the grinding wheel. Alternatively, a uniform wear compensation as shown by Prior Art 2 may be utilized for tooth slots 5-N. However, it should be understood that the wear pattern noted with respect to the master ground workpiece will dictate the slot-to-slot depth setting (i.e. the correction) for the grinding wheel.

As mentioned above, it may be that a freshly-dressed grinding wheel is actually sharper than intended or anticipated such that when preparing the master ground workpiece, some initial slots (e.g. slot 1, or, slots 1 and 2) may be ground deeper than specified. In such a case, the correction of such tooth slots would be to grind to a lesser depth (e.g. at a point D above the "0" in the FIGURE) by some amount (e.g. 0.002 mm) thereby compensating for the excessive sharpness of the freshly-dressed grinding wheel. It has been noted that excessive sharpness is usually compensated after initial grinding of 1-2 tooth slots whereby at slot #3, a zero correction value may be achieved.

It should be understood that for grinding methods wherein non-uniform process conditions are encountered at the inside versus the outside of the grinding wheel (for example, caused by differences in inside versus outside wheel pressure angles, contact length, wheel topography, coolant application, etc.), an angular (i.e. rotational) adjustment of the workpiece may be included as the grinding wheel is fed-in to the tooth slot in the depth (axial) direction. Such rotational adjustment may be made to maintain the proper orientation of the grinding wheel surfaces relative to the respective surfaces of the tooth slot and/or to balance the process conditions affecting the grinding wheel. Even with grinding of tooth slots having equal pressure angles with a grinding wheel having equal-angled sides, an angular adjustment may be included depending upon any non-uniform process conditions.

Although the preferred manner in which to obtain correction amounts for each tooth slot is to produce a master ground workpiece as discussed above, the invention is not limited thereto. Correction amounts may be determined mathematically depending upon wear characteristics (known or learned) of grinding wheel materials such as binders and abrasives as well as workpiece geometry and material. Wear data obtained for certain grinding wheels and workpieces may be stored and used for subsequent jobs of the same tool and workpiece or such data may be used as a starting point for establishing master data for similar tool or workpiece types.

It is to be understood that while the FIGURE illustrates one example of the inventive grinding wheel wear compensation process, the particular form of the graph line is not be taken as limiting. The line representing the invention could be any shape that describes the necessary corrections for addressing the rapid wear aspects of a freshly-dressed grinding wheel.

Although the invention has been discussed with respect to grinding of bevel gears, the invention is not limited thereto. Grinding of cylindrical gears, particularly with disc-shaped (i.e. profile) grinding wheels, may also be carried out in accordance with the inventive method.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A method of grinding a gear with a freshly-dressed grinding wheel, said gear having a plurality of tooth slots, said method comprising:
   grinding each of said plurality of tooth slots,
   wherein for an initial number of said plurality of tooth slots ground, inclusive of a first slot ground, the grinding wheel is fed into each of said tooth slots of said initial number by a respective correction amount so as to compensate for material removal effects of said grinding wheel due to said grinding wheel being freshly-dressed,
   wherein none of said plurality of tooth slots are reground.

2. The method of claim 1 wherein a tooth slot immediately subsequent to said initial number is ground with no correction amount.

3. The method of claim 2 further comprising grinding the remainder of said plurality of tooth slots wherein the grinding of each remaining tooth slot includes a compensation amount for each respective remaining tooth slots based upon normal continual wear of the grinding wheel.

4. The method of claim 1 wherein said initial number is 1, 2 or 3.

5. The method of claim 1 wherein said grinding wheel is a cup-shaped grinding wheel.

6. The method of claim 1 wherein said grinding wheel is a disc-shaped grinding wheel.

7. The method of claim 1 wherein said gear is a bevel gear.

8. The method of claim 1 wherein said gear is a cylindrical gear.

9. The method of claim 1 wherein said respective correction amount for each of said tooth slots of said initial number is determined from a master ground workpiece.

10. The method of claim 1 wherein said respective correction amount for each of said tooth slots of said initial number is determined mathematically based on characteristics of grinding wheel material and gear geometry and material.

* * * * *